United States Patent [19]

Vu et al.

[11] Patent Number: 4,890,907
[45] Date of Patent: Jan. 2, 1990

[54] AUTOMATIC MIRROR LIGHT

[76] Inventors: Thuan D. Vu, 323 18th St., Brooklyn, N.Y. 11215; George Spector, 233 Broadway, #3815, New York, N.Y. 10007

[21] Appl. No.: 377,600
[22] Filed: Jul. 10, 1989
[51] Int. Cl.⁴ .......................... B60R 1/06; B60R 1/12; B60Q 1/22
[52] U.S. Cl. .................... 350/605; 350/612; 350/631; 362/83.1; 362/137
[58] Field of Search .............. 350/605, 612, 631, 632, 350/625, 626; 362/80, 83.1, 137, 82

[56] References Cited

U.S. PATENT DOCUMENTS 4,583,155 4/1986 Hart .................................. 362/83.1

FOREIGN PATENT DOCUMENTS 0188242 8/1986 Japan ................................. 350/631

Primary Examiner—Bruce Y. Arnold
Assistant Examiner—R. D. Shafer

[57] ABSTRACT

An automatic sideview mirror light for a motor vehicle is provided and consists of a frame sideview mirror with a movable housing pivotly mounted to underside. An auxiliary back up light and a curbview mirror are both mounted rearwardly within said housing. When the housing goes into a downward open position the auxiliary back up light will go on to illuminate rear fender of the motor vehicle so that a driver can see at night when looking into the curbview mirror during parking of the motor vehicle.

4 Claims, 1 Drawing Sheet

U.S. Patent    Jan. 2, 1990    4,890,907
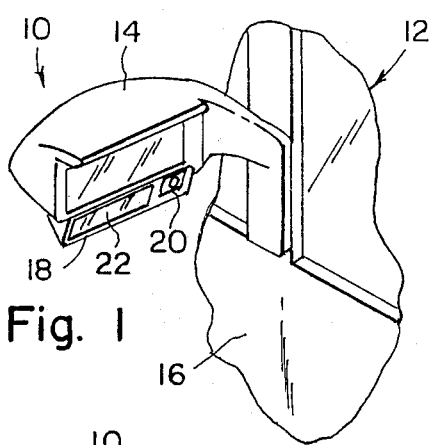
Fig. 1
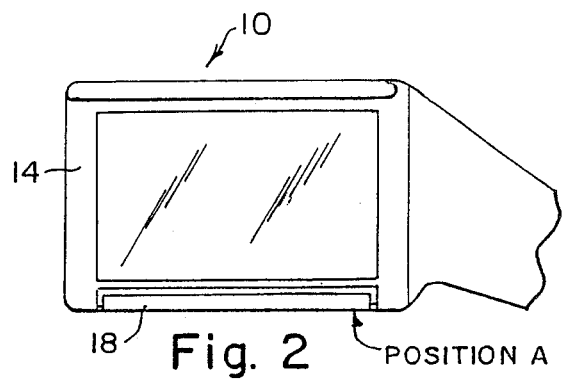
Fig. 2  POSITION A
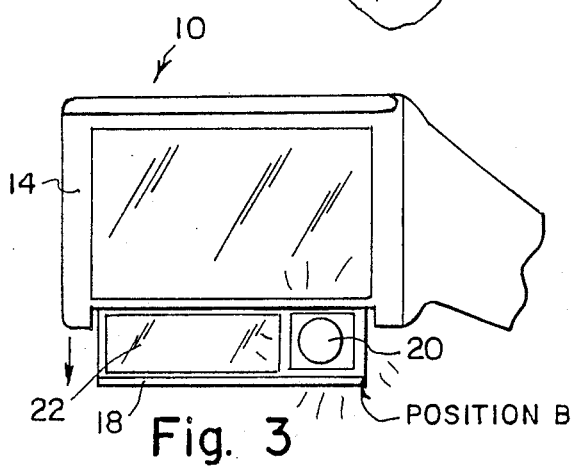
Fig. 3  POSITION B
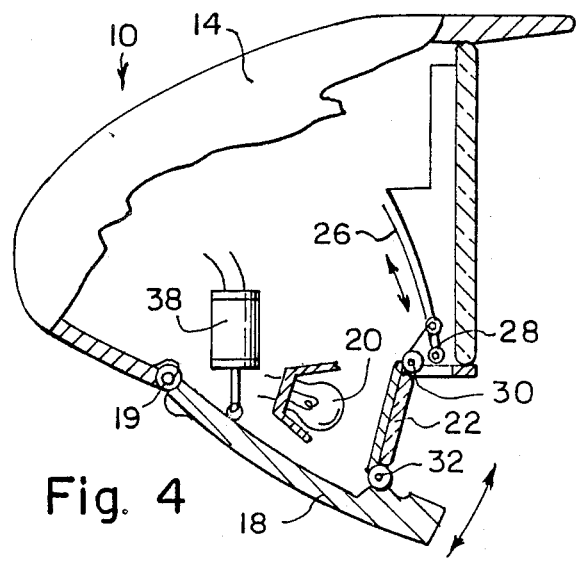
Fig. 4
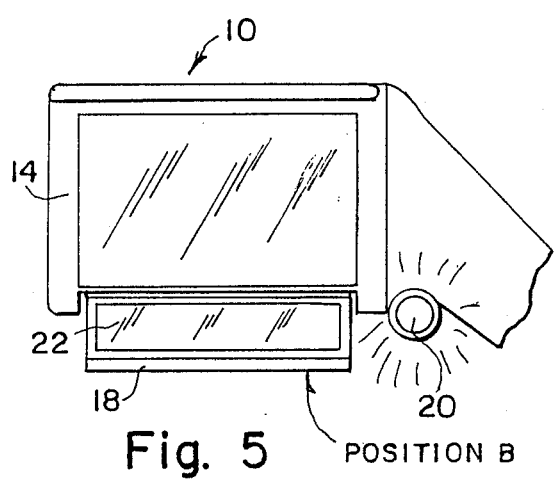
Fig. 5  POSITION B
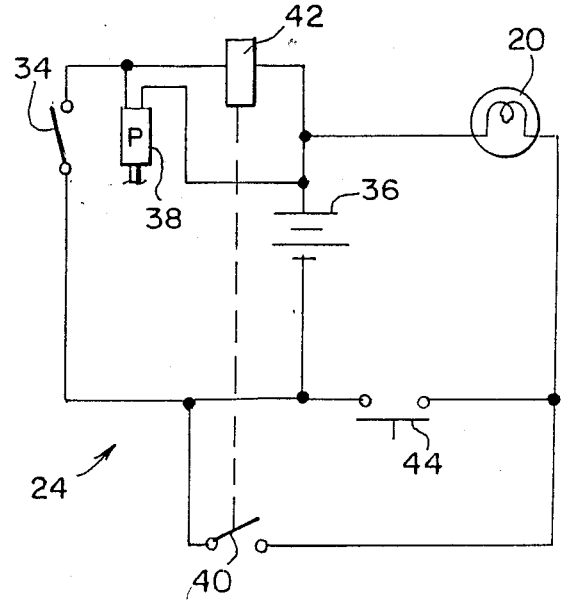
Fig. 6

4,890,907

AUTOMATIC MIRROR LIGHT

BACKGROUND OF THE INVENTION

The instant invention relates generally to sideview mirrors and more specifically it relates to an automatic sideview mirror light for a motor vehicle.

Numerous sideview mirrors have been provided in prior art that are adapted to allow the driver to see behind when driving and parking a motor vehicle. While these units may be suitable for the particular purpose to which they address, they would not be as suitable for the purposes of the present invention as heretofore described.

SUMMARY OF THE INVENTION

A primary object of the present invention is to provide an automatic sideview mirror light for a motor vehicle that will overcome the shortcomings of the prior art devices.

Another object is to provide an automatic sideview mirror light for a motor vehicle in which a movable housing containing a curbview mirror and auxiliary backup light can be activated when the driver puts the gear shift lever into reverse.

An additional object is to provide an automatic sideview mirror light in which the auxiliary backup light can be activated by a switch on the dashboard before the movable housing goes down so that illumination can shine through a two-way sideview mirror.

A further object is to provide an automatic sideview mirror light that is simple and easy to use.

A still further object is to provide an automatic sideview mirror light that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention mounted on a motor vehicle.

FIG. 2 is a front view of the invention with movable housing in a closed position.

FIG. 3 is a front view similar to FIG. 2 with movable housing in an open position.

FIG. 4 is a side view of FIG. 3 with parts broken away and in section showing the internal structure thereof.

FIG. 5 is a front view similar to FIG. 3 showing a modification in which the auxiliary back up light is mounted directly to the frame of the sideview mirror.

FIG. 6 is a schematic diagram of the electrical circuitry for a system in which the auxiliary back up light can be illuminated to shine through the sideview mirror which is a two way mirror before the movable housing goes down.

DETAILED DESCRIPTION OF THE PREFERRED EMBODIMENTS

Turning now descriptively to the drawings, in which similar reference characters denote similar elements throughout the several views, the Figures illustrate an automatic sideview mirror light 10 for a motor vehicle 12 consisting of a framed sideview mirror 14 adapted for attachment to a door 16 of the motor vehicle 12. A movable housing 18 is pivotly mounted at 19 to underside of the sideview mirror 14 so that the movable housing 18 can go between a closed position "A" and an open position "B". An auxiliary back up light 20 is mounted within the housing 18 to face rearwardly of the motor vehicle 12. A curbview mirror 22 is also mounted within the housing 18 to face rearwardly of the motor vehicle 12.

A circuit 24, as shown in FIG. 6, is provided for activating the movable housing 18 to go into the open position "B" by traveling down about twenty five degrees. The circuit 24 will simultaneously activate the auxiliary back up light 20 whereby direct light beams from the auxiliary back up light 20 are directed rearwardly to illuminate rear fender of the motor vehicle 12, allowing a driver to see at night when looking into the curbview mirror 22 during parking of the motor vehicle 12.

As best seen in FIG. 4, a curved track 26 is carried within the framed sideview mirror 14. A roller assembly 28 is carried on upper edge 30 of the curbview mirror 22 to ride within the curved track 26. The curbview mirror 22 is hinged at lower edge 32 to the movable housing 18 to allow the movable housing to travel freely.

The circuit 24 includes a first switch 34 on gear shift lever (not shown). A battery 36 is electrically connected to the first switch 34. A piston 38 is electrically connected between the first switch 34 and the battery 36 and is mechanically connected to the movable housing 18. When the first switch 34 is closed by placing the gear-shift lever into reverse the piston 38 will activate to place the movable housing 18 into the open position "B".

A second switch 40 is electrically connected between the battery 36 and the auxiliary back up light 20. A solenoid 42 is electrically connected between the first switch 34 and the battery 36 and mechanically connected to the second switch 40 so that when the first switch 34 is closed the solenoid 42 will activate to close the second switch 40 to turn on the auxiliary back up light 20.

In a modification the framed sideview mirror 14 can be a two-way mirror. A third switch 14 is carried on a dashboard (not shown) of the motor vehicle 12 and is electrically connected between the battery 36 and the auxiliary back up light 20 so that the auxiliary backup light can be turned on by the third switch 44 when the movable housing 18 is still in the closed position "A". This allows illumination from the auxiliary back up light 20 to shine through the two-way side view mirror 14.

FIG. 5 shows still another modification in which the auxiliary back up light 20 is mounted directly to the framed sideview mirror 14 instead of to the movable housing 18. Operation of the movable housing 18 and the auxiliary back up light 20 is the same as described above.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An automatic sideview mirror light for a motor vehicle which comprises:
   (a) a framed sideview mirror adapted for attachment to a door of the motor vehicle;
   (b) a movable housing pivotably mounted to the underside of said sideview mirror so that said movable housing can go between a closed position and an open position;
   (c) an auxiliary back up light mounted within said housing to face rearwardly of the motor vehicle;
   (d) a curbview mirror mounted within said housing to face rearwardly of the motor vehicle; and
   (e) means for activating said movable housing to go into the open position by traveling down about twenty five degrees and simultaneously activating said auxiliary back up light whereby direct light beams from said auxiliary back up light are directed rearwardly to illuminate the rear fender of said motor vehicle allowing a driver to see at night when looking into said curbview mirror during parking of the motor vehicle.

2. An automatic sideview mirror light as recited in claim 1, further includes:
   (a) a curved track carried within said framed sideview mirror;
   (b) a roller assembly carried on the upper edge of said curbview mirror to ride within said curved track; and
   (c) said curbview mirror hinged at the lower edge to said movable housing to allow said movable housing to travel freely.

3. An automatic sideview mirror light as recited in claim 2, wherein said activating means includes:
   (a) a first switch on a gear-shift lever;
   (b) a battery electrically connected to said first switch;
   (c) a piston electrically connected between said first switch and said battery and mechanically connected to said movable housing so that when said first switch is closed by placing the gear-shift lever into reverse said piston will activate to place said movable housing into the open position;
   (d) a second switch electrically connected between said battery and said auxiliary back up light;
   (e) a solenoid electrically connected between said first switch and said battery and mechanically connected to said second switch so that when said first switch is closed said solenoid will activate to close said second switch to turn on said auxiliary back up light.

4. An automatic sideview mirror light as recited in claim 3, further including:
   (a) said framed sideview mirror being a two-way mirror; and
   (b) a third switch carried on a dashboard of said motor vehicle and electrically connected between said battery and said auxiliary back up light so that said auxiliary backup light can be turned on by said third switch when said movable housing is still in the closed position thus allowing illumination from said auxiliary back up light to shine through said two-way sideview mirror.

* * * * *